(No Model.) 4 Sheets—Sheet 1.

G. F. CHAPPELL.
ROTARY WATER METER.

No. 502,247. Patented July 25, 1893.

WITNESSES:
Edward Wolff.
William Miller

INVENTOR:
George F. Chappell
BY
Van Santvoord & Hauff
ATTORNEYS (No Model.)

G. F. CHAPPELL.
ROTARY WATER METER.

No. 502,247. Patented July 25, 1893.

WITNESSES:
Edward Wolff
William Miller

INVENTOR:
George F. Chappell
BY
Van Santvoord & Hauff
ATTORNEYS (No Model.) 4 Sheets—Sheet 3.

G. F. CHAPPELL.
ROTARY WATER METER.

No. 502,247. Patented July 25, 1893.

WITNESSES:
Edward Wolff
William Miller

INVENTOR:
George F. Chappell
BY
Van Santvoord & Hauff,
ATTORNEYS (No Model.)                    G. F. CHAPPELL.                    4 Sheets—Sheet 4.
                              ROTARY WATER METER.

No. 502,247.                                      Patented July 25, 1893.

WITNESSES:
Edward Wolff
William L. Miller

INVENTOR:
George F. Chappell
BY
Van Santvoord & Hauff
ATTORNEYS

United States Patent Office.

GEORGE F. CHAPPELL, OF NEW YORK, N. Y.

ROTARY WATER-METER.

SPECIFICATION forming part of Letters Patent No. 502,247, dated July 25, 1893.

Application filed June 4, 1891. Serial No. 395,087. (No model.)

*To all whom it may concern:*

Be it known that I, GEORGE F. CHAPPELL, a citizen of the United States, residing at New York, county and State of New York, have invented new and useful Improvements in Fluid Meters, Pumps, and Motors, of which the following is a specification.

This invention relates to certain improvements in fluid meters, pumps and motors as pointed out in the following specification and claims and illustrated in the accompanying drawings, in which—

Figure 1:
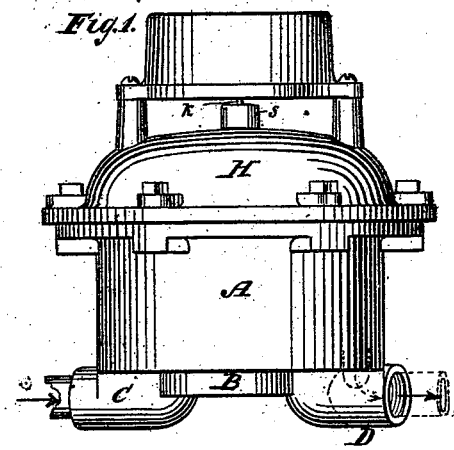
Figure 2:
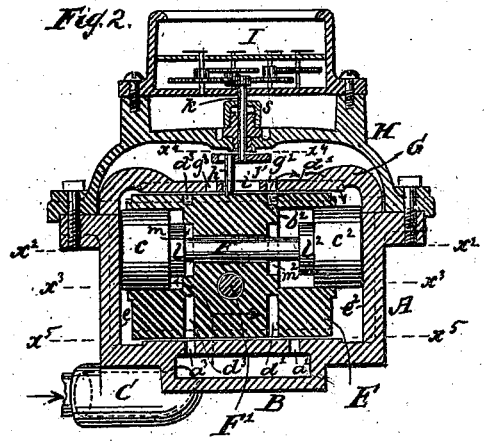
Figure 3:
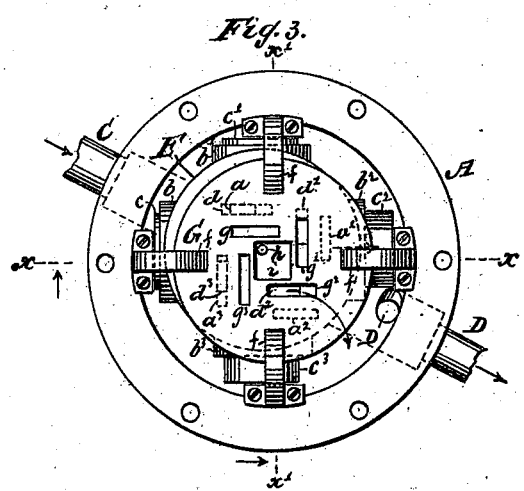
Figure 4:
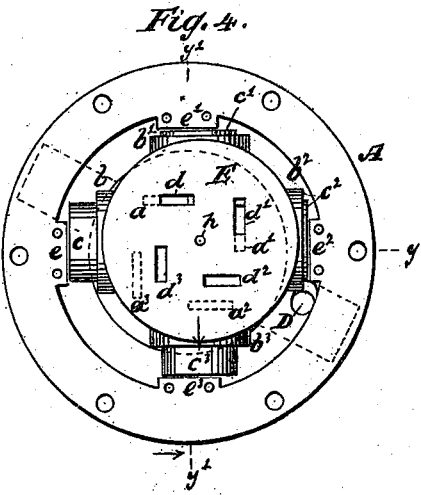
Figure 6:
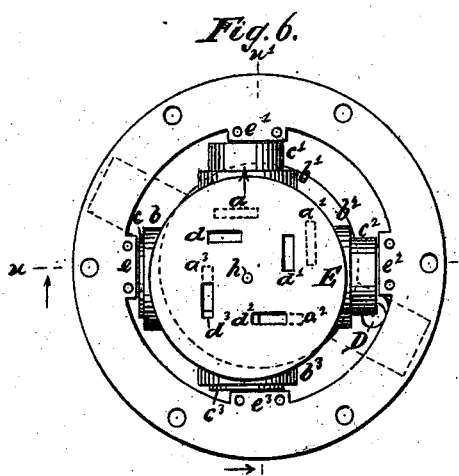
Figure 5:
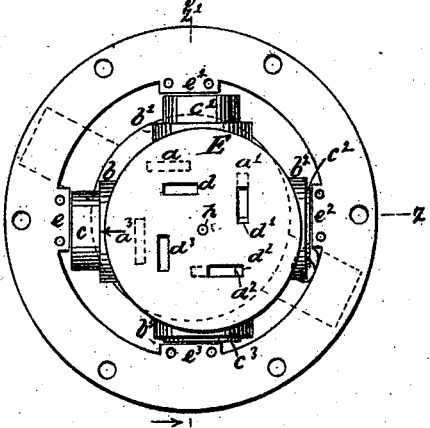
Figure 7:
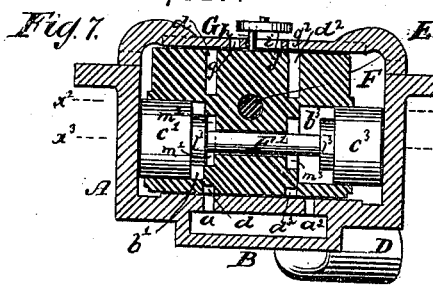
Figure 8:
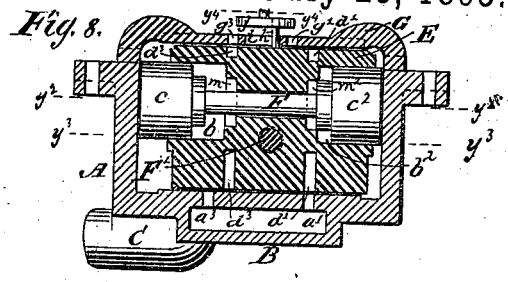
Figure 10:
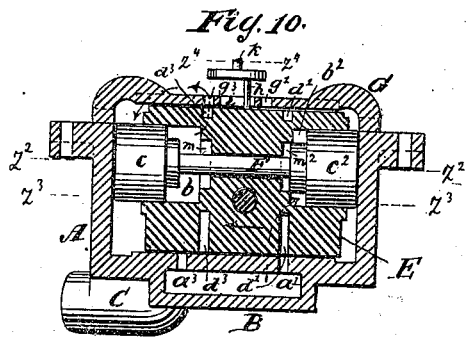
Figure 9:
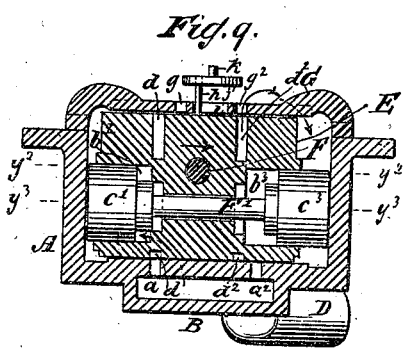
Figure 11:
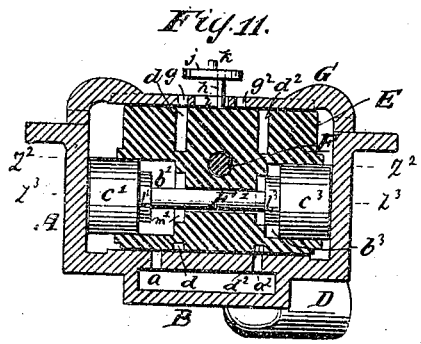
Figure 12:
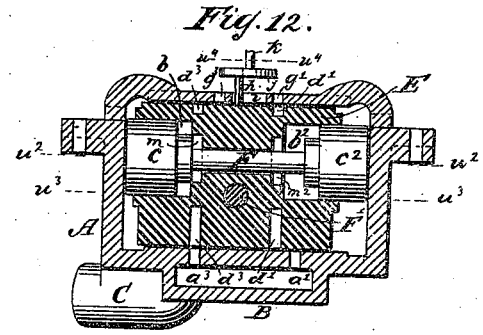
Figure 14:
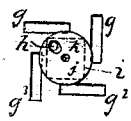
Figure 15:
Figure 13:
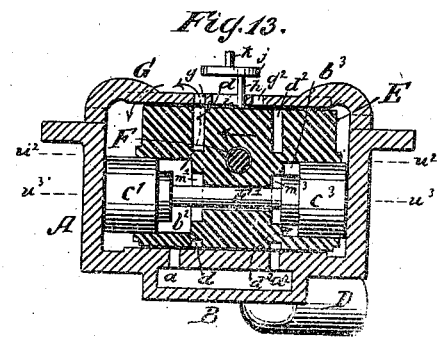
Figure 17:
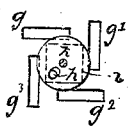
Figure 16:
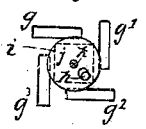
Figure 22:
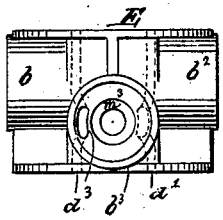
Figure 23:
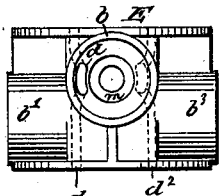
Figure 32:
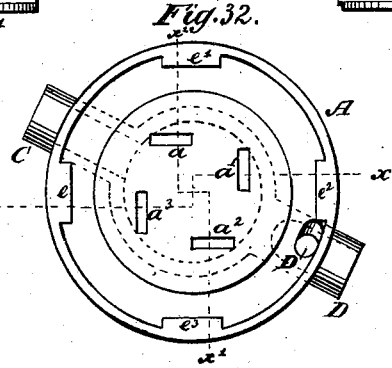
Figure 24:
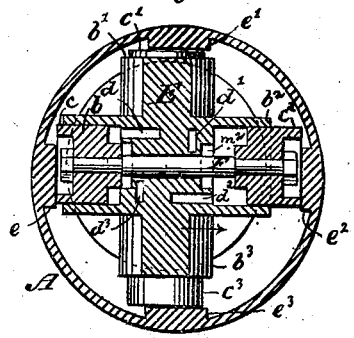
Figure 26:
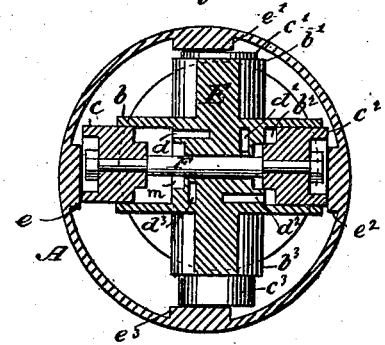
Figure 25:
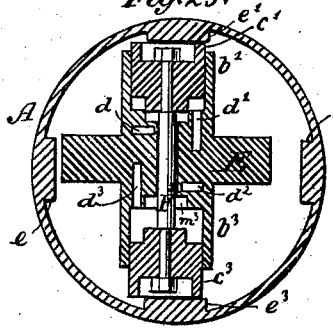
Figure 27:
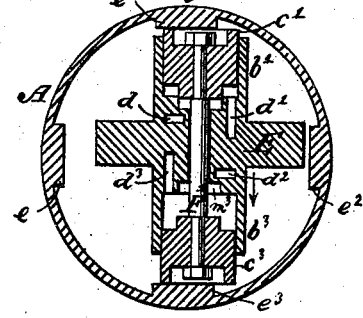
Figure 30:
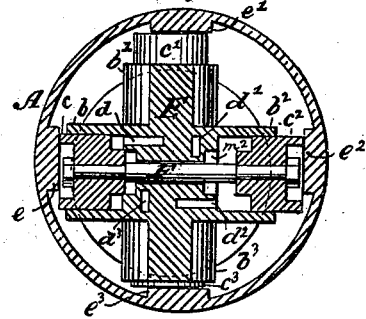
Figure 28:
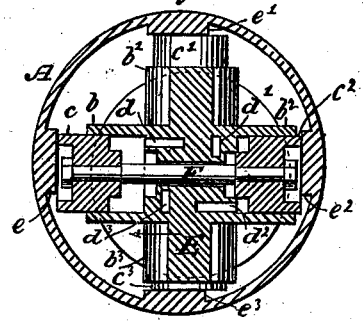
Figure 31:
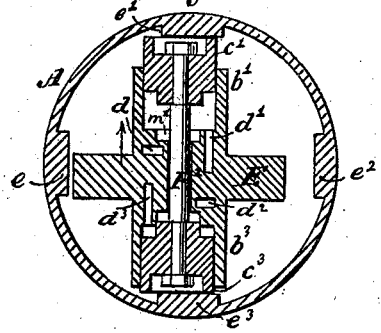
Figure 29:
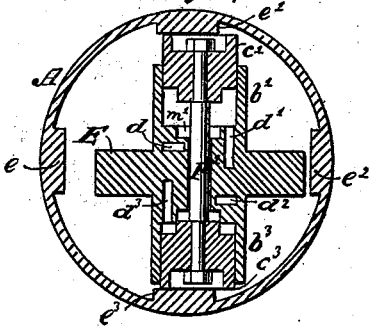

Figure 1 is an elevation of my meter. Fig. 2 is a central section in the plane $x\ x$ Figs. 3 and 32. Fig. 3 is a plan or top view when the cap is removed. Figs. 4, 5 and 6 are plan views of the meter when the cap of the case and the stationary top plate are removed, showing the working parts in different positions. Fig. 7 is a central section in the plane $x'\ x'$ Figs. 3 and 32. Fig. 8 is a central section in the plane $y\ y$ Fig. 4. Fig. 9 is a similar section in the plane $y'\ y'$ Fig. 4. Fig. 10 is a similar section in the plane $z\ z$ Fig. 5. Fig. 11 is a similar section in the plane $z'\ z'$ Fig. 5. Fig. 12 is a similar section in the plane $u\ u$ Fig. 6. Fig. 13 is a similar section in the plane $u'\ u'$ Fig. 6. Fig. 14 is a horizontal section in the plane $x^4\ x^4$ Fig. 2. Fig. 15 is a similar section in the plane $y^4\ y^4$ Fig. 8. Fig. 16 is a similar section in the plane $z^4\ z^4$ Fig. 10. Fig. 17 is a similar section in the plane $u^4\ u^4$ Fig. 12. Figs. 18, 19, 20 and 21 are plan views of the meter (the cap being removed) illustrating the progressive movements of the working parts. Fig. 22 is a side view of the movable cross shaped head showing the interior of one of the lower cylinders. Fig. 23 is a similar view showing the interior of one of the upper cylinders. Fig. 24 is a horizontal section through the upper cylinders in the plane $x^2\ x^2$ Fig. 2. Fig. 25 is a similar section through the lower cylinders in the plane $x^3\ x^3$ Figs. 2 and 7. Fig. 26 is a similar section through the upper cylinders in the plane $y^2\ y^2$ Fig. 8. Fig. 27 is a similar section through the lower cylinders in the plane $y^3\ y^3$ Fig. 8. Fig. 28 is a similar section through the upper cylinders in the plane $z^2\ z^2$ Fig. 10. Fig. 29 is a similar section through the lower cylinders in the plane $z^3\ z^3$ Fig. 10. Fig. 30 is a similar section through the upper cylinders in the plane $u^2\ u^2$ Fig. 12. Fig. 31 is a similar section through the lower cylinders in the plane $u^3\ u^3$ Fig. 12. Fig. 32 is a horizontal section in the plane $x^5\ x^5$ Fig. 2.

In the drawings the letter A designates the containing chamber which communicates by four ports $a\ a'\ a^2\ a^3$ (Fig. 32) with the supply chamber B.

C is the supply pipe which leads into the chamber B and D is the discharge pipe which communicates directly with the containing chamber A (see Fig. 3).

E is a cross shaped head which is movable in the containing chamber and in which are formed four cylinders $b\ b'\ b^2\ b^3$, the cylinders $b\ b^2$ being in line with each other at a higher level than the cylinders $b'\ b^3$ which are also in line with each other but situated sufficiently lower than the cylinder $b'\ b^3$ to permit the piston rods F F' to pass each other, (see Figs. 2, 7, 8, &c.) Into the cylinders $b\ b'\ b^2\ b^3$ are fitted the pistons $c\ c'\ c^2\ c^3$ respectively, the pistons $c\ c^2$ being connected to the upper piston rod F while the pistons $c'\ c^3$ are connected to the lower piston rod F'. The head E is provided with four channels $d\ d'\ d^2\ d^3$ each of which communicates with one of the cylinders $b\ b'\ b^2\ b^3$, that is to say, the channel $d$ communicates with the cylinder $b$ (see Figs. 23, 24 and 26) while the channel $d'$ communicates with the cylinder $b'$ (Figs. 29 and 30), the channel $d^2$ communicates with the cylinder $b^2$ Figs. 24 and 26) and the channel $d^3$ communicates with the cylinder $b^3$ (Figs. 22, 25 and 27) so that whenever the channel $d$ is brought to register with the port $a$ (Fig. 32) the fluid which flows through the pipe C into the supply chamber B is free to enter the cylinder $b$ and when the channel $d'$ is brought to register with port $a'$, the fluid is free to enter the cylinder $b'$, and so on.

As seen in full lines in Fig. 32 and in dotted lines in Figs. 4, 5 and 6, the ports $a\ a'\ a^2\ a^3$ are situated at equal distances from the center of the containing chamber A and the channels $d\ d'\ d^2\ d^3$ are equidistant from the center of the head E but the distance of each of these channels from said center is smaller than the distance of each of the ports $a\ a'\ a^2\ a^3$ from the center of the containing chamber so that by moving the head E in the containing chamber, the channels $d\ d'\ d^2\ d^3$ can be brought to register successively with the ports $a\ a'\ a^2\ a^3$ as will be presently more fully explained.

In the interior of the containing chamber A are formed flat faces $e\ e'\ e^2\ e^3$ and the pistons $c\ c^2$ and $c'\ c^3$ are adjusted on the rods F F' at such distances apart that when the head E is introduced into the containing chamber, the outer faces of the pistons abut snugly against the faces $e\ e'\ e^2\ e^3$ so that when the head E is moved from the position shown in Fig. 3 to that shown in Fig. 4, the pistons $c'\ c^3$ will slide over the faces $e'\ e^3$ while the pistons $c$ and $c^2$ remain stationary and when the head E is moved from the position shown in Fig. 4, to that shown in Fig. 5, the pistons $c\ c^2$ slide over the faces $e\ e^2$ while the pistons $c'\ c^3$ remain stationary.

The head E bears flat upon the bottom of the containing chamber A (Fig. 2) and on the upper surface of said head is placed a flat plate G which is secured to the chamber A by radiating arms $f$ and by screws or suitable fastening devices so that the head is free to move between said plate and the bottom of the supply chamber without permitting any fluid to escape between its bearing surfaces.

Figure 18:
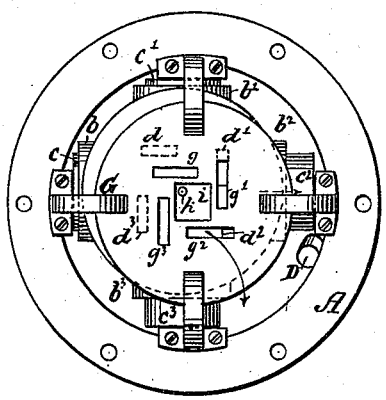
Figure 19:
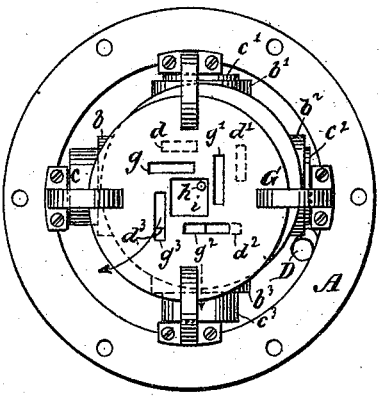
Figure 21:
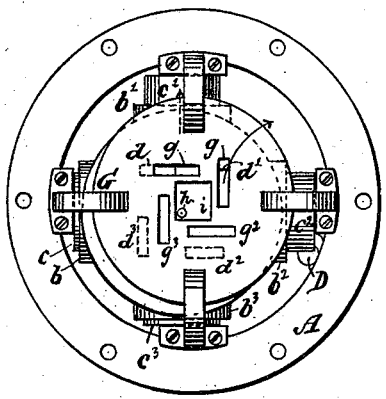
Figure 20:
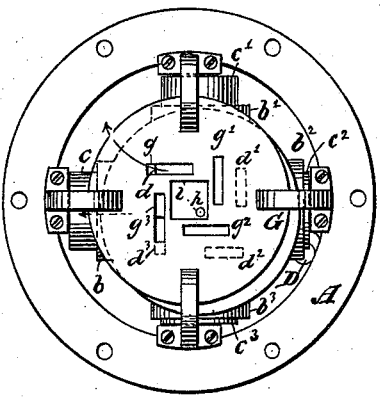

The plate G is provided with ports $g\ g'\ g^2\ g^3$ (Figs. 3 and 18) which are equidistant from the center of said plate but the distance between these ports and said center is smaller than the distance between the channels $d\ d'\ d^2\ d^3$ and the center of the head E (see Fig. 18).

When the head E occupies the position shown in Figs. 3, 18 and 24, the channel $d$ in the head registers with the supply port $a$ (Fig. 3) so as to admit fluid from the supply pipe C into the cylinder $b$. At the same time the channel $d^2$ registers with the discharge port $g^2$ (Fig. 18) so that the fluid contained in the cylinder $b^2$ can be driven out. By the pressure of the fluid which enters the cylinder $b^2$ the head is moved into the position shown in Figs. 4, 19 and 26 and the fluid previously contained in the cylinder $b$ is forced out into the containing chamber A from which it discharges through the pipe D. By this movement the channel $d'$ is brought to register with the supply port $a'$ (Fig. 4) and the channel $d^3$ is brought to register with the discharge port $g^3$ (Fig. 19) and as the fluid enters the cylinder $b'$ the head E is moved into the position shown in Figs. 5, 20 and 28. During this movement the fluid contained in the cylinder $b^3$ is driven out through the discharge port $g$ and at the same time the channel $d^2$ is brought to register with the supply port $a^2$ (Fig. 5) and the channel $d$ with the discharge port $g$ (Fig. 20) so that the head E is moved into the position shown in Figs. 6, 21 and 30; the fluid contained in the cylinder $b^3$ being discharged through the channel $d$ and port $g$. By the last named movement the channel $d^3$ is brought to register with the supply port $a^3$ (Fig. 6) and the channel $d'$ is brought to register with the discharge port $g'$ so that the head E is finally carried back to the position shown in Figs. 3, 18 and 24. The different positions of the upper pistons $c\ c^2$ and the lower pistons $c'\ c^3$ as well as the positions of the supply ports $a\ a^2\ a'\ a^3$, channels $d\ d^2\ d'\ d^3$ and discharge ports $g\ g^2\ g'\ g^3$ during the movements of the head E as above described, are also illustrated in Figs. 7 to 13 inclusive.

On the containing chamber A is firmly secured a cap H so that the fluid which escapes through the discharge ports $g\ g'\ g^2\ g^3$ is compelled to pass downward to the discharge pipe D.

From the head E extends a stud $h$ through an aperture $i$ in the plate G and this stud engages a disk or arm $j$ mounted on the end of an arbor $k$ which extends through a stuffing box $s$ formed on the cap H and which is geared with the counting device I (Fig. 2). The different positions of the stud $h$ and the disk $j$ during the movements of the head E are illustrated in Figs. 14 to 17. The counting device I is of the well known construction used in water meters or gas meters so that the same registers the number of gallons or the number of cubic feet of fluid which pass through the meter.

Each of the pistons $c\ c'\ c^2\ c^3$ is provided on its inner end with an extension $l\ l'\ l^2\ l^3$ of smaller diameter than that of the body of the piston and these extensions co-operate with dash pots $m\ m'\ m^2\ m^3$ formed in the cylinders $b\ b'\ b^2\ b^3$ so as to prevent slamming if the movement of the head is rapid.

It must be remarked that the containing chamber can be made open and simply provided with guides $e\ e'\ e^2\ e^3$ for the pistons $c\ c'\ c^2\ c^3$ and, furthermore, if the top plate G is made to fit tight upon the containing chamber A, the fluid escaping through the discharge ports $g\ g'\ g^2\ g^3$ must be carried off through a pipe leading from the cap H.

When the device is to be used as a pump, the shaft $k$ is rotated by any suitable means so as to impart motion to the head E. In the example shown in the drawings, motion is transmitted from the head E to the shaft $k$ and from this shaft to the counting device. When used as a motor operated by steam, the containing chamber A may be filled with oil or other lubricant for the lubrication of the working parts and in that case the top plate G would be made to fit tight upon the top of the containing chamber and the exhaust pipe would extend from the cap H as above stated.

What I claim as new, and desire to secure by Letters Patent, is—

1. The combination with the containing chamber, the supply pipe and the discharge pipe, of a head provided with cylinders and movably fitted in the containing chamber, pistons fitting the cylinders and extending through said head and carried by it, suitable supply ports and passageways for controlling the flow of the fluid from the supply pipe to the discharge pipe and a counting device actuated by the head, substantially as described.

2. The combination with the containing chamber A, the supply chamber B, supply pipe C leading into, the supply chamber, and the discharge pipe D leading from the containing chamber of the head E, the cylinders $b\ b'\ b^2\ b^3$ formed in said head, the pistons $c\ c'\ c^2\ c^3$ fitting the cylinders, the top plate G, the cap H, the supply ports $a\ a'\ a^2\ a^3$, the channels $d\ d'\ d^2\ d^3$ and the discharge ports $g\ g'\ g^2\ g^3$, substantially as described.

3. The combination with the containing chamber A, the supply chamber B, the supply pipe C and the discharge pipe D of the head E, the cylinders $b\ b'\ b^2\ b^3$ formed in said head, the dash pots $m\ m'\ m^2\ m^3$ formed in the cylinders, the pistons $c\ c'\ c^2\ c^3$ fitting the cylinders, the extensions $l,\ l'\ l^2\ l^3$ on said pistons, the top plate G, the cap H, the supply ports $a\ a'\ a^2\ a^3$, the channels $d\ d'\ d^2\ d^3$ and the discharge ports $g\ g'\ g^2\ g^3$, substantially as described.

4. A head or hub having upper and lower valve faces and provided with suitable ports and passageways, and the cylinders formed on the head, substantially as described.

5. A head or hub having upper and lower valve faces, the cylinders formed on the head and the pistons and rods arranged to extend through the head, substantially as described.

6. A head or hub having upper and lower valve faces, the cylinders formed on the head, the pistons and rods extending through the head and the containing chamber having projections to hold the pistons and to form guides for the motions of the pistons and hub, substantially as described.

In testimony whereof I have hereunto set my hand in the presence of two subscribing witnesses.

GEORGE F. CHAPPELL.

Witnesses:
WM. C. HAUFF,
E. F. KASTENHUBER.